No. 841,726. PATENTED JAN. 22, 1907.
W. M. SHAW.
LOGGING DEVICE.
APPLICATION FILED DEC. 30, 1904.

Witnesses
Raphael Setter
R. B. Cavanagh

Inventor
William M. Shaw
By his Attorneys
Gifford & Bull

UNITED STATES PATENT OFFICE.

WILLIAM M. SHAW, OF GREENVILLE, MAINE.

LOGGING DEVICE.

No. 841,726.                Specification of Letters Patent.           Patented Jan. 22, 1907.

Application filed December 30, 1904. Serial No. 239,022.

*To all whom it may concern:*

Be it known that I, WILLIAM M. SHAW, a citizen of the United States, and a resident of Greenville, State of Maine, have invented a new and useful Improvement Applicable to Logging or other Purposes, of which the following is a specification.

In logging by power, particularly in small timber, it is customary to secure a number of logs to a single skidding, pulling, or hauling line. A separate chain or rope is made fast to each log, and these various chains are strung or otherwise secured to the skidding-line at various points along its length. As soon as the line is hauled in the various chains bunch toward the rear end of the line, so that considerable difficulty is often experienced in detaching the logs at the point of delivery.

The invention which is the subject of the present application facilitates this character of logging and will also probably be found useful for other purposes.

Figure 1:
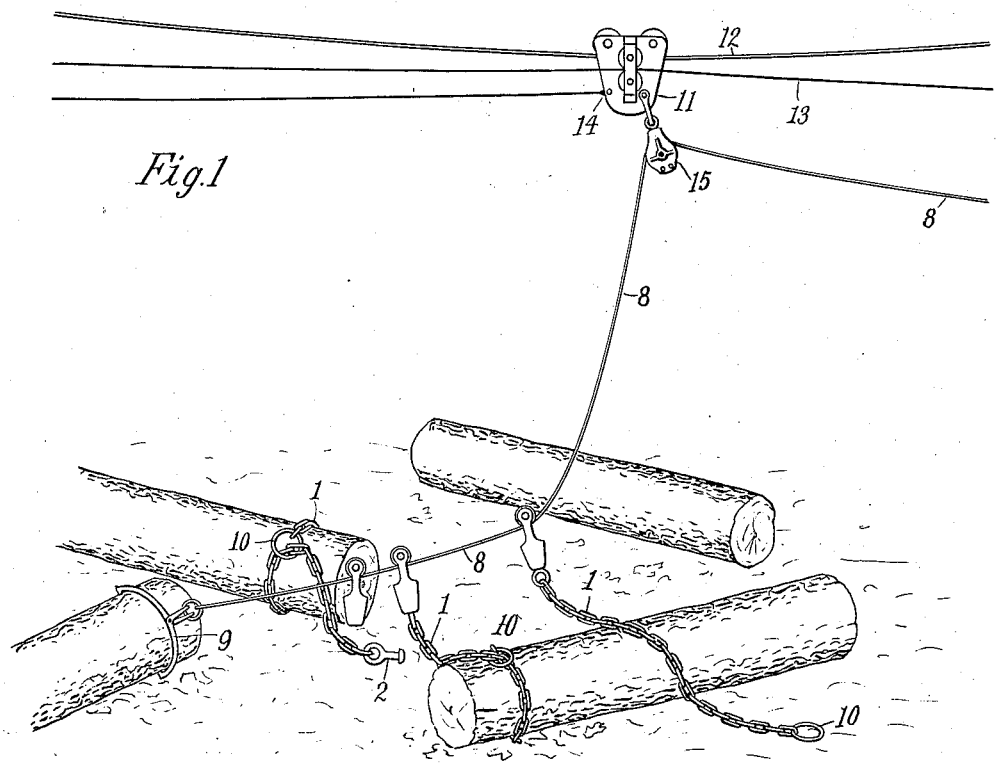
Figure 2:
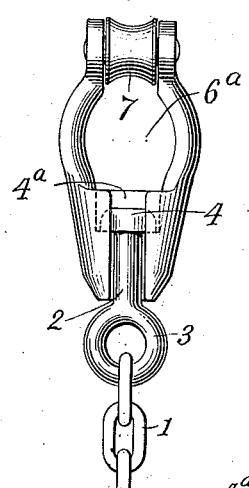
Figure 3:
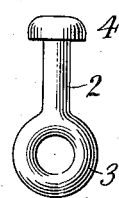
Figure 4:
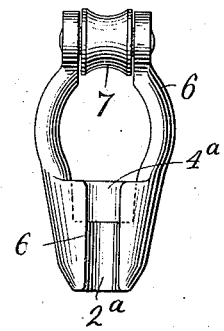
Figure 5:
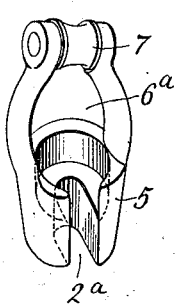
Figure 6:
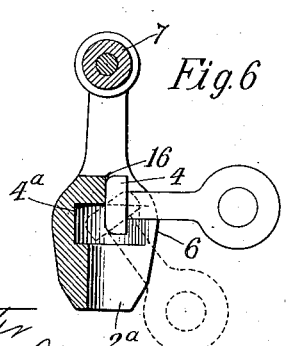

In the accompanying drawings, Figure 1 is a side view of a suspended skidding apparatus employing my invention. Fig. 2 shows a portion of the chain and the eyebolt connected therewith in combination with the eye-socket. Fig. 3 shows the eyebolt detached from the socket, and Fig. 4 shows the socket detached from the eyebolt in side view. Fig. 5 shows a perspective view of the socket detached from the eyebolt. Fig. 6 is a longitudinal section of the socket.

1 is the chain or rope for connecting with the log.

2 is the body of the bolt connected with the chain by the eye 3 and having the head 4.

5 is a socket having a longitudinal hole to fit the body 2 of the bolt and slotted at 6 on one side, so as to permit the bolt to be inserted and removed laterally. From the top of the socket 5 extends the eye $6^a$, preferably carrying at its top the friction-roller 7. A series of these sockets will be strung upon the skidding or hauling rope 8, as shown in Fig. 1. The end of the skidding or hauling rope will carry a tongs 9 or other suitable means for preventing the sockets from running off of the end.

Each of the chains 1 carries upon its end, by preference, a ring 10, though a hook will answer and is sometimes used for securing the end of the chain to itself after passing around a log.

In the drawings, 11 is the ordinary skidding-carriage; 12, the supporting-cable.

13 is the carriage traction-line extending from the head-support to the tail-support and back again to the carriage, where its end is made fast at 14.

The skidding or hauling line 8 extends from the head-support over the carriage-sheave 15.

It will be observed by Fig. 6 that the bore of socket is made to contain a constricted portion $2^a$, corresponding in diameter with but not so long as the body of the bolt 2, and an enlarged or rabbeted portion 4, corresponding in diameter with the head of the bolt. Thus when the bolt is inserted laterally the head of the bolt is within the eye $6^a$; but as soon as it has reached a concentric position within the socket it drops down, so that its head occupies the rabbet 4, in which position it is secure from any accidental displacement.

As an addition to the above the socket may be provided with a stop 16 in its eye, as shown in Fig. 6, so that in order to insert the head of the bolt it is necessary that it should be done with the body of the bolt standing laterally, and after the head is inserted in this position the body of the bolt is inserted by pivoting upon its head. Thus in the longitudinal section of Fig. 6 the bolt is shown as in the act of having its head inserted in full lines and is in dotted lines shown during the movement of pivoting upon its head, whereby its body or shank is swung laterally to the axis of the socket. When thus constructed, the stop 16 will effectually prevent any accidental disengagement of the bolt from its socket.

The preferable way to operate this device is to carry the end of the hauling-line 8 off at a distance and make the tongs or chain on its end fast to a log, then to slack the line and carry different parts of its body around to the vicinity of different logs, so that it lies upon the ground in a serpentine course. This line already has upon it a plurality of the sockets, each one of which preferably makes an antifriction running connection with the line, so that enough sockets will be already on the line to furnish all of the connections that are necessary for the various logs that it is desired to haul. Chains have already been applied to each of the logs, and the eyebolts on the ends of these chains are respectively placed in the several sockets. Then by hauling in on the line the various sockets will run toward the end of the line, where they are accumulated against the tongs or chain whereby the end log is secured. After the bunch of logs has been hauled in to the desired point each log and its chain may be readily detached from the line by slipping its eyebolt laterally from its socket, leaving the socket still upon the line to be returned for another load of logs.

What I claim as new, and desire to secure by Letters Patent, is—

1. In a logging apparatus, the combination of an elevated support, a block movable on said support and carrying a sheave, a cable passing over the said sheave and a chain-holder or connecting device loosely receiving said cable.

2. In a logging apparatus, in combination, a hauling-line, a series of eyes in running connection therewith each carrying a socket and a series of log chains or ropes each provided with a device adapted to engage said socket.

3. In a logging apparatus, in combination, a hauling-line, a series of eyes in running connection therewith each provided with a socket having a lateral opening and a series of log ropes or chains provided with devices adapted to engage said sockets by being placed therein laterally.

4. In a logging apparatus in combination, a hauling-line, a socket having a head through which the hauling-line passes transversely, such socket containing a lateral entrance-opening and a log line or rope carrying a device adapted to enter said socket laterally.

5. In a logging apparatus, in combination, the hauling-line, a socket forming a running engagement therewith, a device adapted to engage a log and means whereby said device may be engaged with said socket.

6. In a logging apparatus, in combination, the hauling-line, a socket movably connected therewith, a device for engaging a log and means whereby said device may be detachably secured to said socket.

7. In a logging apparatus, in combination, the hauling-line, a series of sockets adapted to move along the line, a series of devices for engaging logs and means whereby each of said devices is detachably secured to one of said sockets.

8. In a logging apparatus, in combination, the hauling-line, a series of sockets movably connected thereto by antifriction connections, a series of devices for engaging logs and means whereby each of said devices is detachably secured to one of said sockets.

9. A body 5 containing a longitudinal socket and a lateral entrance thereto, in combination with an eye 6ª provided with an antifriction-roller 7.

10. The body 5 containing the longitudinal constricted socket-opening 2ª and the rabbeted socket-opening 4ª and a lateral entrance to the same, in combination with means whereby said socket may be secured.

11. The body 5, containing the constricted socket 2ª, the rabbeted socket-opening 4ª, the stop 16 and a lateral entrance to said socket-opening, in combination with means whereby said socket may be secured.

12. In a logging apparatus, in combination a hauling-line, a log-engaging device, and a running connection between the hauling-line and the log-engaging device.

13. In a logging apparatus, in combination a hauling-line, a log-engaging device, and a separable coupling having one member in running engagement with the hauling-line, and a second member permanently secured to the log-engaging device.

14. In a logging apparatus in combination the hauling-line, a log-engaging device, and a coupling having one member provided with a roller adapted to ride on said line, and a second member secured to the log-engaging device and adapted to be coupled with the first-mentioned member.

In testimony whereof I have hereunto signed my name in the presence of two subscribing witnesses.

WILLIAM M. SHAW.

Witnesses:
SPENCER MILLER,
J. H. DICKINSON.